Aug. 1, 1933.   S. M. MORIYA   1,920,268
METAL COFFEE RECEPTACLE
Filed May 18, 1932
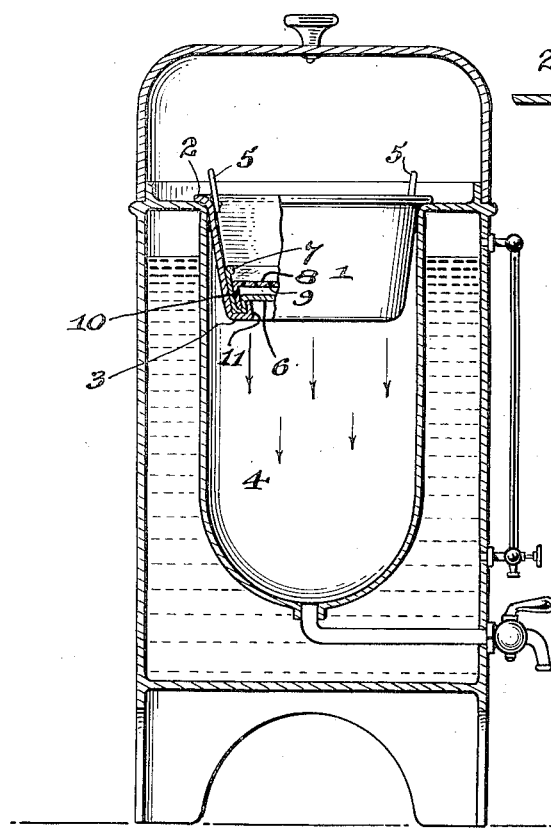
Inventor
SABURO M. MORIYA
By Donald L. Mayson
Attorney Patented Aug. 1, 1933

1,920,268

UNITED STATES PATENT OFFICE 1,920,268

METAL COFFEE RECEPTACLE

Saburo M. Moriya, Arden, Del., assignor of one-half to Frank L. Grier, Milford, Del.

Application May 18, 1932. Serial No. 612,108

7 Claims. (Cl. 53—3.)

This invention relates to improvements in coffee receptacles, and more particularly to a metal coffee receptacle which may be used in any desired type of coffee urn or pot, and which will be so constructed that all of the water poured in the receptacle will pass through the coffee instead of a portion of the water escaping directly into the bottom of the urn or pot as is the case with most types of coffee receptacles.

An object of the invention is to provide an improved metal coffee receptacle which will be so constructed that there will be absolutely no side seepage of the water into the coffee urn or pot.

Another object of the invention is to provide an improved metal coffee receptacle having a removable plug forming a combined water spreader and means for holding the filter cloth in position to deflect the fall of the water as it is poured into the receptacle and to prevent churning between the deflector and cloth, to facilitate the setting of the coffee between the said deflector and filter cloth to efficiently act as a filter.

A further object of the invention is to provide an improved metal coffee receptacle which will preferably be made from stainless steel or acid resisting material, comprising a shell or outer body, a perforated plug water deflector and a washable filter cloth provided with an edge binding to facilitate the positive positioning of the same between the adjacent surfaces of the shell and plug.

A still further object of the invention is to provide an improved metal coffee receptacle which will be highly efficient in use and which will be quite inexpensive to manufacture.

Other objects will appear as the description proceeds.

In the accompanying drawing which forms a part of my application,

Figure 1 is a vertical sectional view through a coffee urn showing my invention applied thereto;

Figure 2 is an enlarged sectional view showing my improved metal coffee receptacle;

Figure 3 is a plan view of the perforated water spreading and deflecting plug;

Figure 4 is a side elevation of a coffee pot with my improved metal coffee receptacle applied thereto, and Figure 5 is a detail view of one form of locking means for locking the water deflecting and spreading plug in position within the metal shell.

Like characters of reference are used throughout the following specification and the accompanying drawing to designate corresponding parts.

In carrying out my invention, I provide a cylindrical tapered metal shell 1 having an outwardly directed flange 2 about its upper end and an internal annular groove 3 formed on its lower end, said groove 3 being adapted to receive and support my improved water deflecting and spreading plug and the filter cloth, while the flange 2 supports the metal coffee receptacle within a coffee urn 4. Suitable handles 5 are secured to the inner wall of the shell or body 1, whereby the same may be positioned within a coffee urn or pot, and readily removed when desired.

The inwardly extending annular flange or groove 3 on the lower end of the shell 1 is formed with an upwardly extending annular wall 11, which is slightly conical and lies in a plane parallel with the wall or shell 1. A filter cloth 6 provided with an edge or outer binding 7 is adapted to be placed across the opening in the lower end of the shell 1 and on the inside thereof, after which the plug 8 will be forced down on the cloth and into the annular groove 3, in such a manner that the filter cloth 6 will be secured across the bottom of the said shell 1 in spaced relation to the perforated plug 8 and below the same. The water spreading and deflecting plug 8 is provided with a plurality of perforations 9 and with a downwardly extending tapering wall 10, which portion engages the filter cloth and is received within the groove 3. The taper of the wall 10 is of the same degree as the taper of the shell 1 and and the annular wall 11, so that there is a definite wedging of the several associated parts. A suitable handle 12 will be positioned on the upper surface of the plug 8, whereby the same may be readily placed in, or removed from the shell or body of the metal coffee receptacle.

In Figure 4 of the drawing, I have illustrated my improved metal coffee receptacle in position within an ordinary household coffee pot, and in this form of receptacle, the handles 13 will be positioned on the exterior of the shell 1.

In Figure 5 of the drawing, I have illustrated indentations 14 and cooperating extensions 15 formed on the shell and plug, respectively, for positively locking the same in position for use after the filter cloth has been placed in position, to further augment the wedging action of the parts. It is immaterial whether the indentations 14 and extensions 15 are arranged as shown in the drawing, or are reversed in position. If desired, other forms of locking means may be employed. When the receptacle is used with an ordinary coffee pot, a cover 16 will be utilized to cover the same.

Many minor changes in detail of construction may be used without departure from the spirit of the invention.

Having thus described my invention what I claim as new and desire to secure by Letters Patent of the United States is:

1. A metal coffee receptacle comprising a tapered shell having an outwardly extending flange at its upper end and an inwardly extending annular groove about its lower end, a perforated plug having a tapered wall extending in the same plane with the tapered shell and adapted to be received within said annular groove, and a filter cloth provided with an edge binding clamped between said plug and groove.

2. A metal coffee receptacle comprising a tapered shell having an outwardly extending flange at its upper end and an inwardly extending annular groove about its lower end, the walls of said groove and said shell extending in parallel planes, a perforated water spreading and deflecting plug provided with a depending tapered wall extending in a plane parallel with the walls of the annular groove and shell and adapted to be received within said groove, and a filter cloth provided with an edge binding clamped between said plug and groove.

3. The subject matter as claimed in claim 2, and said filter cloth when in position extending below and in spaced relation with the perforated water spreading and deflecting plug, with the edge binding of the cloth lying above the upper surface of said plug, substantially as set forth.

4. The subject matter as claimed in claim 2, and handles formed on said shell and on the water spreading and deflecting plug whereby the several parts may be placed in or removed from cooperating relationship.

5. The subject matter as claimed in claim 2, and cooperating notch and pin projections formed in said shell and plug for positively locking the same in assembled position.

6. A metal coffee container comprising a shell having an outwardly extending flange at its upper end and an inwardly extending annular groove about its lower end, the walls of said groove and shell extending in parallel planes, a perforated water spreading and deflecting disk provided with a depending wall extending in a plane parallel with the walls of the annular groove and shell and adapted to be received within said groove, a filter cloth provided with an edge binding clamped between said disk and groove forming a coffee ground receiving space of such depth between said disk and filter cloth to permit a portion of the coffee placed in the container to pass through the perforated disk into the space between the disk and filter cloth, completely filling said space thereby forming a filter bed.

7. A coffee container comprising a shell and a perforated plug positioned therein, said plug provided with a depending flange, a filter medium tautly held and supported solely at its edges between said flange and shell and beneath said perforated plug and initially in spaced parallel relation thereto, whereby a predetermined space is formed to be filled by some of the coffee placed upon the plug.

SABURO M. MORIYA.